(12) United States Patent
Yang et al.

(10) Patent No.: US 12,373,139 B2
(45) Date of Patent: Jul. 29, 2025

(54) SYSTEMS AND METHODS FOR INPUT/OUTPUT DISPATCH

(71) Applicants: Lemon Inc., Grand Cayman (KY); Beijing Volcano Engine Technology Co., Ltd., Beijing (CN)

(72) Inventors: Zhengyu Yang, Los Angeles, CA (US); Hao Wang, Los Angeles, CA (US); Sheng Qiu, Los Angeles, CA (US); Jianyang Hu, Beijing (CN); Yang Liu, Los Angeles, CA (US); Yizheng Jiao, Los Angeles, CA (US); Qizhong Mao, Los Angeles, CA (US); Jiaxin Ou, Beijing (CN); Ming Zhao, Beijing (CN); Yi Wang, Beijing (CN); Jingwei Zhang, Beijing (CN)

(73) Assignee: Lemon Inc., Grand Cayman (KY)

( * ) Notice: Subject to any disclaimer, the term of this patent is extended or adjusted under 35 U.S.C. 154(b) by 120 days.

(21) Appl. No.: 18/475,481

(22) Filed: Sep. 27, 2023

(65) Prior Publication Data
US 2024/0036767 A1    Feb. 1, 2024

(51) Int. Cl.
| G06F 12/00 | (2006.01) |
| G06F 3/06 | (2006.01) |
| G06F 12/08 | (2016.01) |
| G06F 12/0802 | (2016.01) |

(52) U.S. Cl.
CPC .......... *G06F 3/0659* (2013.01); *G06F 3/0604* (2013.01); *G06F 3/0635* (2013.01); *G06F 3/067* (2013.01); *G06F 12/08* (2013.01); *G06F 12/0802* (2013.01)

(58) Field of Classification Search
None
See application file for complete search history.

(56) References Cited

U.S. PATENT DOCUMENTS

| 2016/0210208 A1* | 7/2016 | Chen | G06F 11/1438 |
| 2017/0249310 A1* | 8/2017 | Kumar | G06F 12/0891 |
| 2023/0359360 A1* | 11/2023 | Tang | H04L 67/1031 |

* cited by examiner

*Primary Examiner* — Daniel D Tsui
(74) *Attorney, Agent, or Firm* — Fish & Richardson P.C.

(57) ABSTRACT

Decoupled computing systems include layers of same-type computing resources, and include a dispatch layer to assign tasks from one layer to another, such as input and output (I/O) flows. The I/O flows can be assigned to particular computing resources of a layer based on a weighted moving average of performance data for the layer. When traffic is high, the assignment can include random assignment to some or all of the computing resources in the layer. The I/O flows can be split between read-intensive and write-intensive flows, with more read-intensive flows being assigned based on a pick ratio.

20 Claims, 10 Drawing Sheets

SYSTEMS AND METHODS FOR INPUT/OUTPUT DISPATCH

FIELD

This disclosure is directed to systems and methods for dispatching input and output (I/O) requests in a distributed computing system.

BACKGROUND

Resources, even in distributed computing systems, tend to be coupled to one another, for example in the form of servers that each include memory, central processing units (CPUs), graphics processing units (GPUs), and the like. The coupling of resources can limit the flexibility and scalability, as resources are scaled as complete coupled systems including each of the categories of resource. The scaling using coupled units does not necessarily correspond to the demands for particular individual types of resources. Further, queuing of input and output (I/O) requests is often based on a fairness principle or other such heuristics, and/or a priori determinations of performance.

SUMMARY

This disclosure is directed to systems and methods for dispatching input and output (I/O) requests in a distributed computing system.

By distributing resources into pooled layers of decoupled, same-type resources, resources are efficiently assigned to corresponding computing tasks in a manner that can be deemed flexible and scalable. By prioritizing read-intensive I/O flows over write-intensive I/O flows, the effect of write-intensive I/O flows on waiting times can be relatively reduced, maintaining the order of operations and improving the performance of the computing system. By using a weighted moving average within a window to determine performance on which dispatching decisions are made, the dispatching decisions can be made using the most relevant data and with reduced computing overhead resulting from attempting to account for outdated performance data. By adding constrained and/or unconstrained random assignment of I/O flows to resources based on the traffic level, large volumes and spikes in traffic can be effectively assigned without unduly overloading individual resources.

In an embodiment, a distributed computing system includes a first plurality of decoupled computing resources of a first type, the first plurality of decoupled resources being a first layer of the distributed computing resources and a second plurality of decoupled computing resources of a second type. The second plurality of decoupled resources are a second layer of the distributed computing system. The second layer configured to receive operations provided by the first layer. The distributed computing system further includes a dispatch layer. The dispatch layer is configured to assign at least some of the operations provided by the first layer to at least some of the computing resources of the second plurality of decoupled computing resources of the second layer based on a weighted moving average of the statuses over time of at least some of the second plurality of decoupled computing resources.

In an embodiment, the first layer is a client layer and the second layer is a cache layer. The second plurality of decoupled computing resources are respective storage memories. The operations are input/output (I/O) flows. In an embodiment, the respective storage memories include dynamic random access memory (DRAM). In an embodiment, the respective storage memories are solid state drives (SSDs). In an embodiment, the dispatch layer is configured to divide the I/O flows into a read-intensive queue and a write-intensive queue based on a write percentage of each of the I/O flows. In an embodiment, the dispatch layer is configured to assign I/O flows of the read-intensive queue and I/O flows of the write-intensive queue according to a pick ratio, and the pick ratio is a ratio of a plurality of I/O flows of the read-intensive queue to be assigned for each one of the I/O flows of the write-intensive queue to be assigned.

In an embodiment, the weighted average is an exponentially weighted moving average.

In an embodiment, the dispatch layer is configured to determine an amount of incoming operation traffic. In an embodiment, the dispatch layer is configured to compare the determined amount of incoming operation traffic to a first threshold and a second threshold. When the amount of incoming operation traffic is above the first threshold and below the second threshold, the dispatch layer is configured to assign the operations provided by the first layer randomly among a subset of the computing resources of the second plurality the subset selected based on a weighted moving average of the statuses over time of the second plurality of decoupled computing resources. In an embodiment, the one or more processors are configured to assign the operations provided by the first layer randomly to the entire second plurality of computing resources when the amount of incoming operation traffic is above the second threshold.

In an embodiment, a method for assigning operations to computing resources, includes obtaining weighted averages for a status over time of a plurality of decoupled computing resources, receiving one or more operations to be assigned to the plurality of decoupled computing resources, and assigning the one or more operations to at least some of the plurality of decoupled computing resources based on the weighted averages for the status over time of a plurality of decoupled computing resources.

In an embodiment, the weighted averages are exponential weighted averages.

In an embodiment, the operations are input/output (I/O) flows, and the method further comprises dividing the I/O flows into a read-intensive queue and a write-intensive queue based on a write percentage of each of the I/O flows. In an embodiment, the I/O flows of the read-intensive queue and I/O flows of the write-intensive queue are assigned according to a pick ratio, and the pick ratio is a ratio of a plurality of I/O flows of the read-intensive queue to be assigned for each one of the I/O flows of the write-intensive queue to be assigned.

In an embodiment, the method further includes determining an amount of incoming operation traffic.

In an embodiment, the method further includes comparing an amount of incoming operation traffic to a first threshold, and a second threshold. When the amount of incoming operation traffic is above the first threshold and below the second threshold, the method includes assigning the operations provided by the first layer randomly among a subset of the computing resources of the second plurality, the subset selected based on a weighted moving average of the statuses over time of the second plurality of decoupled computing resources. In an embodiment, when the amount of incoming operation traffic is above the second threshold, assigning the operations provided by the first layer randomly to the entire second plurality of computing resources.

In an embodiment, a data center includes a first plurality of decoupled computing resources of a first type, a second plurality of decoupled computing resources of a second type, and a dispatch layer. The dispatch layer is configured to assign at least some operations provided by the first layer to at least some of the computing resources of the second plurality of decoupled computing resources of the second layer based on a weighted moving average of the statuses over time of at least some of the second plurality of decoupled computing resources.

In an embodiment the decoupled computing resources of the second type are cache storage memories. In an embodiment, said operations are I/O flows, and the dispatch layer is configured to divide the I/O flows into a read-intensive queue and a write-intensive queue based on a write percentage of each of the I/O flows.

DRAWINGS

DETAILED DESCRIPTION

This disclosure is directed to systems and methods for dispatching input and output (I/O) requests in a distributed computing system.

As used herein, "decoupled" refers to computing resources that are not directly connected to other types of computing resources in a particular computing device such as a server. Decoupled computing resources can be indirectly connected to other types of computing resources by connections between layers or the like.

As used herein, "same-type" refers to computing resources all sharing a particular function, such as CPUs, GPUs, storage memories, cache memories, dispatchers, or the like. In an embodiment, the computing resources referred to as being "same-type" may include multiple different components having the same function, such as different models of CPUs or GPUs, different sizes or types of memories for storage or cache memories, and the like. In an embodiment, at least some of the computing resources referred to as being "same-type" may be identical to one another, such as being the same model of CPU, GPU, memory device, and the like.

Figure 1:
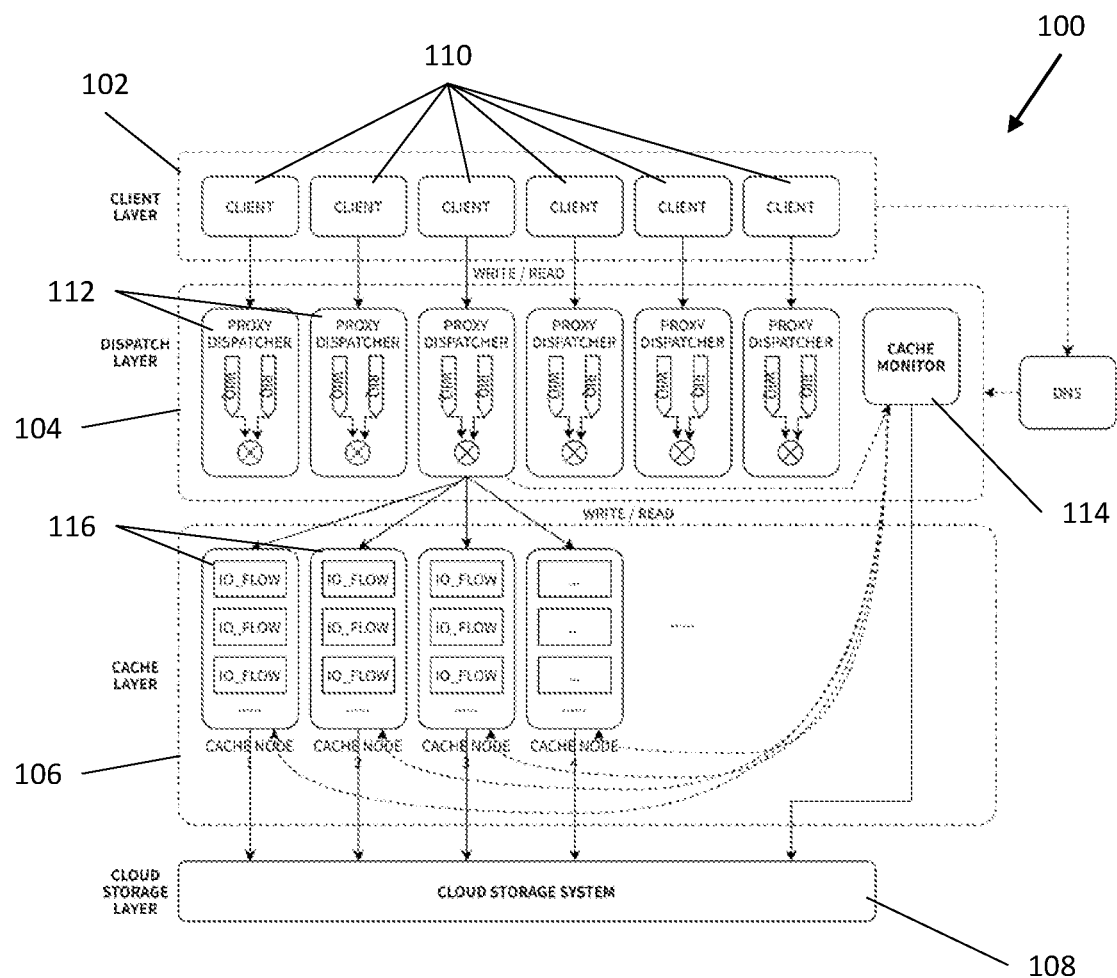
FIG. 1 shows a schematic of a distributed computing system according to an embodiment.

FIG. 1 shows a schematic of a distributed computing system according to an embodiment. Distributed computing system 100 includes client layer 102, dispatch layer 104, cache layer 106, and cloud storage layer 108. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

Distributed computing system 100 is a data center including decoupled resources pooled into the respective layers. The layers can each include same-type computing resources. The distributed computing system 100 can provide any suitable functions of a data center including, as non-limiting examples, storing and processing data.

Client layer 102 is a layer including client devices 110 interfacing with the distributed computing system 100. The client devices 110 can interface with the distributed computing system 100 through one or more suitable libraries and/or application programming interfaces (APIs). Client devices can be connected to the nearest proxies provided in distributed computing system 100 by one or more domain name servers (DNS) configured to enable discovery of the nearest proxy. In an embodiment, the DNS can provide multiple proxy addresses, allowing the clients to switch proxies, for example, if one proxy times out. In an embodiment, the DNS can support load balancing and/or fault recovery for the proxies.

In the example embodiment shown in FIG. 1, dispatch layer 104 is configured to direct I/O flows from client devices 110 to particular cache resources of the cache layer 106. The dispatch layer 104 includes a plurality of dispatchers 112. Each of the dispatchers 112 is configured to receive I/O flows from one or more of the client devices 110 and to direct the I/O flows to particular cache devices 116 of the cache layers 106. In an embodiment, the I/O flows are assigned directly to the cache devices 116 of the cache layer 106. In an embodiment, the I/O flows can be assigned to a queue for the I/O flows through which the I/O flows proceed to the particular cache devices 116 of the cache layer 106. In embodiments, dispatch layer 104 can be provided between suitable layers of distributed computing system 100 such that any operations being assigned by one layer can be assigned to the resources of the other suitable layer. The dispatching by dispatch layer 104 can allow cache layer 106 to provide a stateless cache. In an embodiment, this dispatching can simplify cache protocols and thus reduce computing overhead in the distributed computing system 100. In an embodiment, dispatch layer 104 includes cache layer monitor 114, which is configured to obtain statuses for some or all of cache devices 116. The cache layer monitor can be configured to obtain the statuses periodically, for example at regular intervals such as every one minute or every five minutes. Periodically obtaining statuses can reduce the computing overhead associated with obtaining the statuses of the cache devices 116 while providing sufficient information for operation of the dispatchers 112.

Cache layer 106 is a layer that provides cache resources. Cache layer 106 can include multiple cache devices 116. The cache layer can use virtualization and/or pooling of the cache devices to provide cache storage for the distributed computing system 100. The pooling and virtualization can increase the utilization of the cache devices 116. Cache devices 116 can be any suitable storage media for cache operations, with non-limiting examples including memory such as dynamic random access memory (DRAM), persistent memory (PMEM), solid state drives (SSDs) such an NVMe protocol SSDs, and the like. Caching performed at the cache layer can be according to any suitable cache algorithm, with non-limiting examples of caching algorithms including segment least recently used, first-in first-out, L2ARC caching, or the like. In an embodiment, data eviction in the cache layer 106 can be performed according to any suitable method, such as side-by-side or tiering methods. The cache layer 106 can be where read and write operations are first handled. In an embodiment, when cache devices 116 become full, at least some of the data from the full cache device can be made persistent when provided to the cloud storage layer 108. In an embodiment, when a request for data from client layer 102 cannot be met by the data in cache layer 106, the requested data can be obtained from the cloud storage layer 108.

Cloud storage layer 108 includes one or more persistent memory devices, such as PMEM, solid state drives such as NVMe SSDs, hard disk drives (HDDs) and the like. The persistent memory devices can be virtualized and/or pooled. Data eviction in the cloud storage layer 108 can be according to any suitable method, such as side-by-side or tiering methods. As discussed above, cloud storage layer 108 can provide persistent storage for data from cache layer 106, for example when a cache device 116 becomes full. In an embodiment, cloud storage 108 can provide requested data when the requested data cannot be obtained from the cache layer 106.

Figure 2:
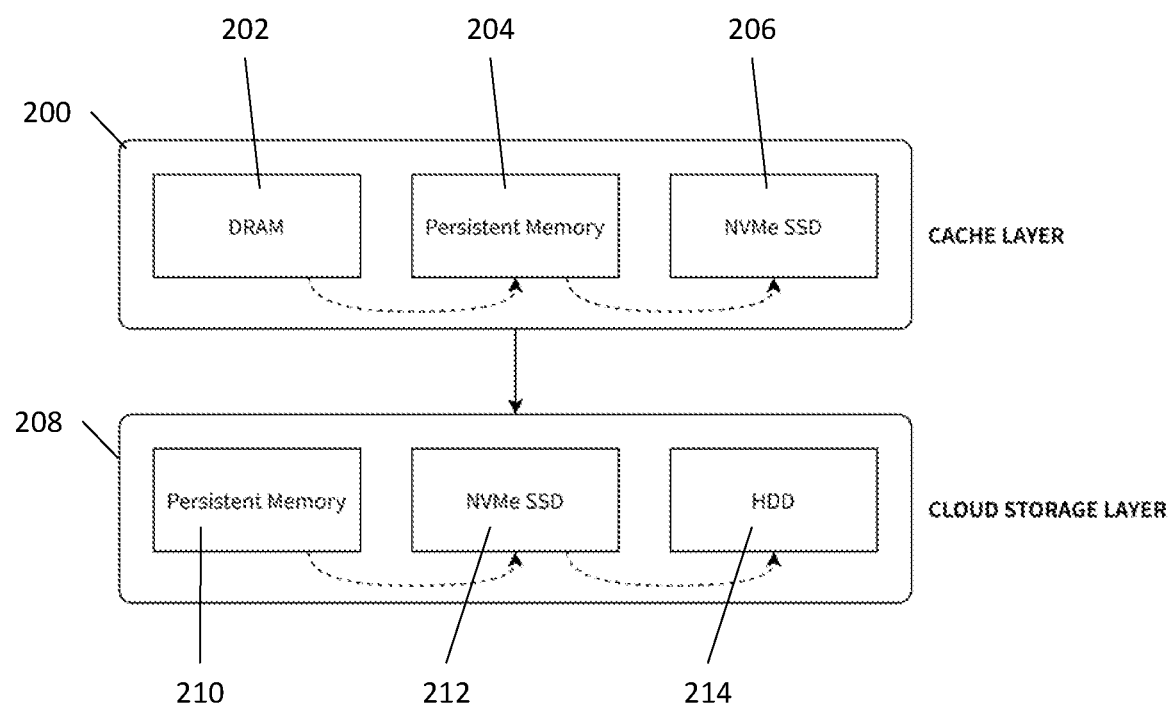
FIG. 2 shows schematics of cache and cloud storage layers according to an embodiment.

FIG. 2 shows schematics of cache and cloud storage layers according to an embodiment. Cache layer 200 includes DRAM 202, PMEM 204, and SSDs 206. Cloud storage layer 208 includes PMEM 210, SSDs 212, and HDDs 214.

Cache layer 200 is used to provide cache storage for a distributed computing system such as distributed computing system 100 as described above and shown in FIG. 1. The cache layer can be the cache layer 106 as described above and shown in FIG. 1. Cache layer 200 can include different types of storage devices, including for example the DRAM 202, PMEM 204, and SSDs 206. The storage devices in the cache layer can be arranged and/or utilized according to the respective capacity, bandwidth and latency for the respective storage device. DRAM 202 is dynamic random access memory, having the highest bandwidth and lowest latency, but lowest capacity. PMEM 204 offers moderate capacity, bandwidth, and latency, and SSDs 206 provide the highest capacity but lowest bandwidth and highest latency in cache layer 200 as shown in FIG. 2.

Cloud storage layer 208 provides persistent storage for a distributed computing system such as distributed computing system 100 described above and shown in FIG. 1. The cloud storage layer 208 can be the cloud storage layer 108 as described above and shown in FIG. 1. Cloud storage layer 208 can include different types of storage devices, such as PMEM 210, SSD 212, and HDDs 214. The devices of cloud storage layer 208 can be arranged and/or utilized according to the respective capacity, bandwidth and latency for the respective storage device. Of the devices used in cloud storage layer 208, the PMEM 210 can offer the highest bandwidth and lowest latency, while having the lowest capacity, with SSDs 212 providing relatively moderate capacity, bandwidth, and latency, and HDDs 214 providing the greatest capacity with the lowest bandwidth and highest latency among the devices included in cloud storage layer 208 as shown in FIG. 2.

Figure 3:
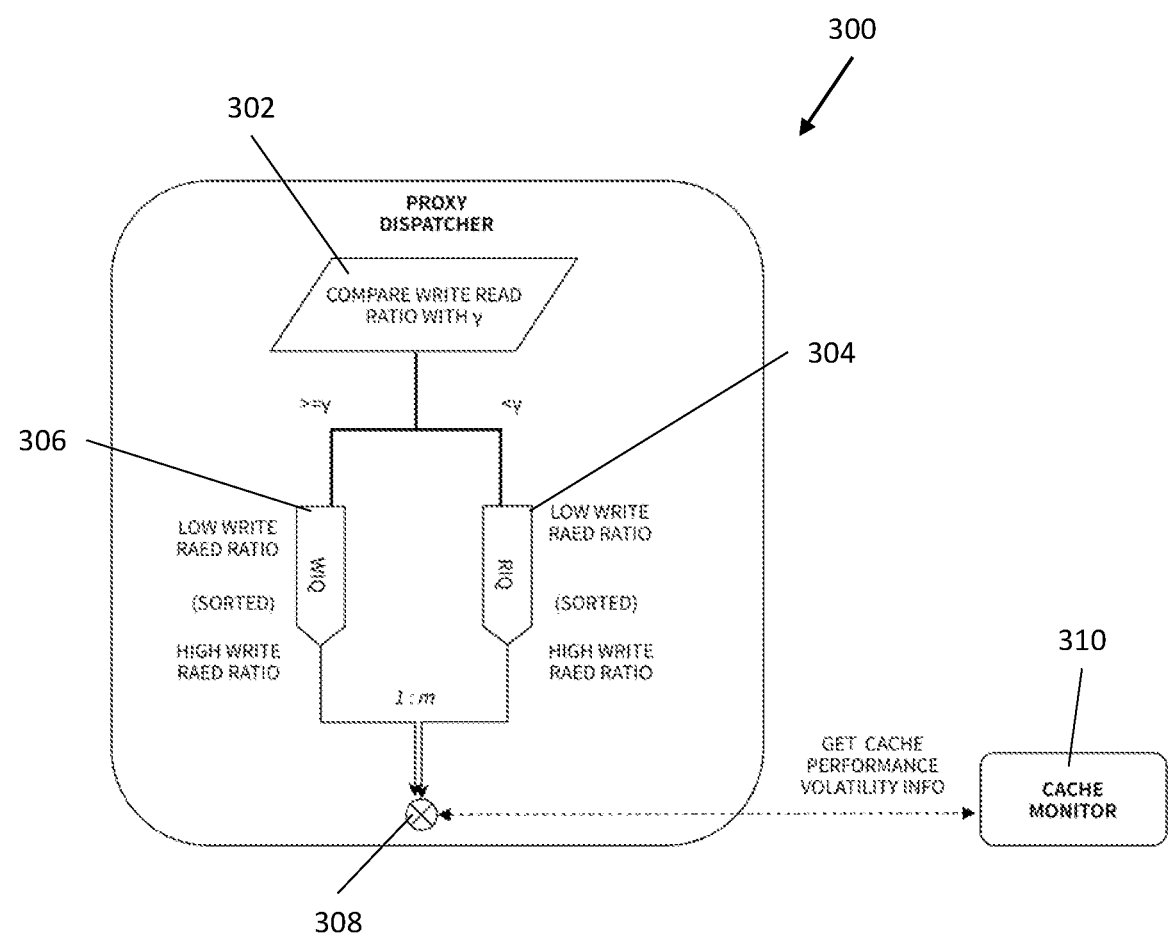
FIG. 3 shows a schematic of a dispatcher of a dispatch layer according to an embodiment.

FIG. 3 shows a schematic of a dispatcher of a dispatch layer according to an embodiment. Dispatcher 300 includes read/write comparison module 302, read-intensive queue 304, write-intensive queue 306, dispatch output 308, and monitor 310.

Dispatcher 300 can be a member of a dispatch layer, such as the dispatch layer 104 described above and shown in FIG. 1. The dispatcher 300 can be a proxy that a client, such as a client device 110 connects to, with the connection facilitated by a DNS directing the client to the dispatcher 300. The dispatcher can receive requested operations, such as requested I/O flows from the client device.

Read/write comparison module 302 receives the requested I/O flows and determines the relative read and write intensity of the I/O flow. The read/write comparison module 302 can include any suitable hardware, software, or combinations thereof capable of determining relative read and write intensity for a received I/O flow. The relative read and write intensity can be, for example, a read percentage, a write intensity, a read/write ratio, or any other suitable metric for determining relative read and write intensity for the I/O flow. The relative read and write intensity can be compared to a threshold, the threshold selected such that the I/O flow is directed a queue corresponding to the read- or write-intensity thereof. As one non-limiting example, where the relative read and write intensity are measured as a write percentage of the I/O flow, the I/O flow can be assigned to a read-intensive queue 304 when the write percentage is below 60% and the assigned to the write-intensive queue 306 when the write percentage of the I/O flow is 60% or greater.

Read-intensive queue 304 is a queue of I/O requests that the read/write comparison module determines to be read-intensive. The read-intensive queue 304 can be filled with read-intensive I/O requests when more I/O requests arrive than can be output from dispatch output 308. Write-intensive queue 306 is a queue of I/O requests that the read/write comparison module determined to be write-intensive. The write-intensive queue 306 can be filled with write-intensive I/O requests when more I/O requests arrive than can be output from dispatch output 308.

Dispatch output 308 is configured to dispatch I/O requests from the read- and write-intensive queues 304, 306 to suitable resources, such as cache devices 116 of cache layer 106 as described above and shown in FIG. 1. The dispatch output can select I/O requests to dispatch from the read- and write-intensive queues 304, 306 according to a pick ratio. The pick ratio can be any suitable ratio for efficiently assigning requests to the resources, for example based on the relative resource consumption of read operations versus write operations. In an embodiment, the pick ratio can be a 1:m ratio, where one write-intensive I/O request is taken from write-intensive queue 306 and assigned to a resource for each m read-intensive I/O requests taken from the read intensive queue 304 and assigned to a resource. M can be a value greater than 1. Having m greater than one gives priority to read-intensive I/O flows, which typically have higher performance requirements than write-intensive ones. This is because writing operations are generally much slower than reading operations, and a flow with a higher fraction of write-intensive requests can slow down a concurrently running flow that is read-intensive, protecting the fairness of the allocation of resources to handling each request that is made, and improving the performance in carrying out all of the respective I/O requests.

The I/O requests can be assigned by dispatch output 308 to one of a plurality of destinations. The destinations can be, for example, a particular disk of a cache node, a cache node including one or more disks, or any other such suitable storage of the cache layer. The target destination can be selected based on the performance volatility of that destination. The performance volatility can be a quantification of how an I/O request may negatively impact other I/O flows at that potential destination. The performance volatility can be determined by taking a weighted average of historical values of slowdown and current slowdown as measured in a most recent sampling. The weighted average can be according to any suitable weighting, such as, as a non-limiting example, an exponentially weighted moving average. The weighting can emphasize recent results such that older results have diminished impact on the determination of performance volatility. The performance slowdown used for determining performance volatility can be calculated based on average response times of the destination. The average response times can be sums of response times for all I/O flows being handled by the destination. In an embodiment, the average response time can be a ratio of the sum of response time of all I/O flows hosted on the destination during the most recent sample to the sum of the workload amount of all I/O flows hosted on the destination during said most recent sample. For example, the performance slowdown can be calculated by dividing the response time for the destination from a most recent sampling by the response time for the destination from a previous sampling. Higher values can indicate greater slowdown, for example due to loading of the destination, or other detriments to performance. The assignment of the I/O requests to a destination by dispatch output 308 can be to the destination having the lowest performance volatility at the time of dispatching, or any other suitable relationship of performance volatility to the selection of destination. In an embodiment, In embodiments, the assignment of I/O requests to resources can further be based on a level of operation traffic, with random assignment to a selected subset of resources in a layer or random assignment to any resource of a layer being performed as described below and shown in FIG. 5.

Monitor 310 can be used to obtain statuses for some or all of the devices included in the layer to which dispatch output 308 assigns operations, such as cache devices of a cache layer. The monitor 310 can be configured to obtain the statuses periodically, for example at regular intervals such as every one minute or every five minutes. Obtaining the statuses periodically can reduce the computing overhead associated with obtaining the statuses of the devices while providing sufficient information for operation of the dispatchers.

Figure 4:
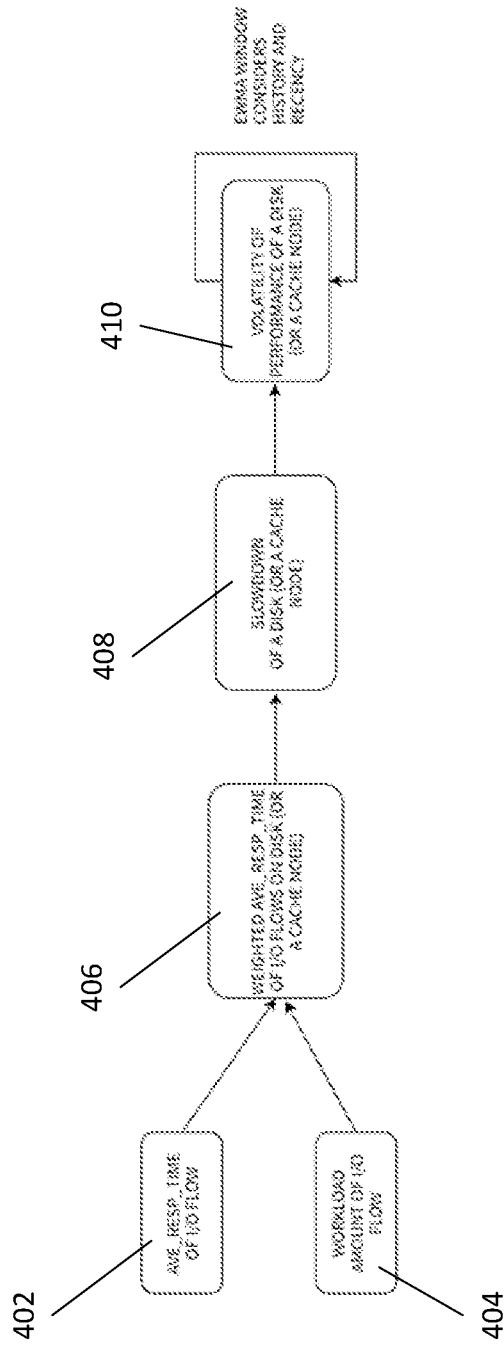
FIG. 4 shows a flowchart of a method for determining performance volatility according to an embodiment.

FIG. 4 shows a flowchart of a method for determining performance volatility according to an embodiment. Method 400 includes obtaining an average response time for an I/O flow at 402, obtaining a workload amount of an I/O flow at 404, determining a weighted average response time for I/O flows at 406, determining a slowdown of a disk or a cache node at 408, and determining a volatility of performance of the disk or cache node at 410.

Method 400 is a method by which performance volatility can be determined for a particular resource, such as a cache node or a disk or other storage media thereof, for example for use as an input into dispatching decisions such as that performed by dispatchers 300, dispatchers 112 of a dispatch layer 104, or the like, as shown in FIGS. 1 and 3 and described above.

Response time(s) of the resource is obtained at 402. The response time(s) for the resource can be a sum of a response time for one or more I/O flows hosted on the resource during a most recent sampling period of response times, for example periodic monitoring by a cache layer monitor 114 or monitor 310 as those are described above and shown in FIGS. 1 and 3.

A workload amount of the resource is obtained at 404. The workload amount for the resource can be, for example, defined as working volume size (e.g. a footprint) for the resource, defined as working set size (e.g. in bytes) for the resource, or defined as the number of I/O operations being performed by the resource.

A weighted average response time the resource is determined at 406. The weighted average response time can be determined based on the average response time and workload amounts for the resource over time, including a most recent sampling and previous samplings within the window. A weighted average can be computed based on the samplings taken within a sampling window. The weighting can favor the most recent data, such as the most recent sampling over prior samplings from within the sampling window. The weighting can utilize any suitable weighting scheme, such as linear weighting, exponential weighting, or the like. In an embodiment, the weighting is exponential weighting.

A slowdown of a disk or a cache node is determined at 408. The slowdown can be determined based on the change in the weighted average response time of the resource. For example, the slowdown can be calculated at 408 based the average response time of the resource during the most recent sampling divided by the average response time of the resource during one or more previous samples.

A volatility of performance of the disk or cache node is determined at 410. The determined volatility of performance can be determined based on the slowdown of the disk or cache node over time, for example changes in the slowdown as determined at 408. For the following functions herein, the terms are provided in the following table:

TABLE I

| Term | Description |
| --- | --- |
| $d \in D$ | Each cache storage node's disk d in the all disks in all cache storage nodes D. |
| $\tau$ | Current epoch. |
| $V_{[d, \tau]}$ | Volatility of disk d during epoch $\tau$. |
| $S_{[d, \tau]}$ | Performance comparison between current epoch $\tau$ and last epoch $\tau - 1$ of disk d. |
| $\beta$ | Weighting Adjustment for the weighting of the moving average. An example value of it can be 0.4. |
| $\overline{RT}_{[d, \tau]}$ | Average response time (end-to-end) of all I/O flows running on d during the epoch $\tau$. |
| $RT_{[d, f, \tau]}$ | Average response time (end-to-end) of all I/O flows f running on d during the epoch $\tau$. |
| $f \in [d, \tau]$ | All I/O flows running on disk d during the epoch $\tau$. |

TABLE I-continued

| Term | Description |
| --- | --- |
| $W_{[d, f, \tau]}$ | Workload amount of all I/O flows f running on disk d during the epoch $\tau$. |
| $B_{[\tau]}$ | Burst degree of the I/O flows during epoch $\tau$. |
| $W_{[WIQ, \tau]}$, $W_{[RIQ, \tau]}$ | Workload amount of write-intensive queues (WIQ) and read-intensive queues (RIQ) during epoch $\tau$, respectively. |
| $K \in [1, |D|]$ | Top-k random K. |
| $\rho_L, \rho_H$ | Preset low and high thresholds for traffic conditions |
| $|D|$ | Total number of disks in the cache layer. |
| $\epsilon \in [0, 1]$ | Percentage of the total number of disks in the cache layer we are going to pick for top-k random. |
| m | The number of I/O flows from WIQ per one I/O flow from RIQ. |
| $\gamma \in [0, 1]$ | Preset write percentage threshold for determining if the I/O flow is read-intensive or write-intensive. An example value of it can be 80%. |
| WIQ, RIQ | Write-intensive queue, and read-intensive queue. |

In an embodiment, the assignment of an I/O flow to a particular disk can be performed based on the following function:

$$\operatorname{argmin}_{(d \in D)}: \mathbb{V}_{[d,\tau]} = \beta \cdot S_{[d,\tau]} + (1-\beta) \cdot \mathbb{V}_{[d,\tau-1]} \quad (1)$$

Where:

$$S_{[d,\tau]} = \frac{\overline{RT}[d, \tau]}{\overline{RT}[d, \tau-1]} \quad (2)$$

$$\overline{RT}[d, \tau] = \frac{\sum_{f \in [d,\tau]} \left(RT[d, f, \tau]\right)}{\sum_{f \in [d,\tau]} \left(W[d, f, \tau]\right)} \quad (3)$$

Function (1) discussed above can be made more efficient by reducing the number of terms. In particular, $\mathbb{V}_{[d,\tau]}$ as provided in function (1) can be truncated based on a boundary to the number of previous epochs of time that are considered.

Function (1) can be expressed as $\mathbb{V}_{[d,\tau]} = \beta \cdot [ \mathbb{V}_{[d,\tau-1]} + (-\beta) \cdot \mathbb{V}_{[d,\tau-2]} + (1-\beta)^2 \cdot \mathbb{V}_{[d,\tau-2]} + (1-\beta) \cdot \mathbb{V}_{[d,\tau-2]} + (1-\beta)^3 \cdot \mathbb{V}_{[d,\tau-3]} + \ldots ]$. Where this is truncated to q epochs function (1) can be simplified to function (4) as follows:

$$\mathbb{V}_{[d,\tau]} = \beta \cdot [\Sigma_{q \in [0, q_{max}]} [(1-\beta)^q] \mathbb{V}_{[d,\tau-q-1]}] \quad (4)$$

Figure 5:
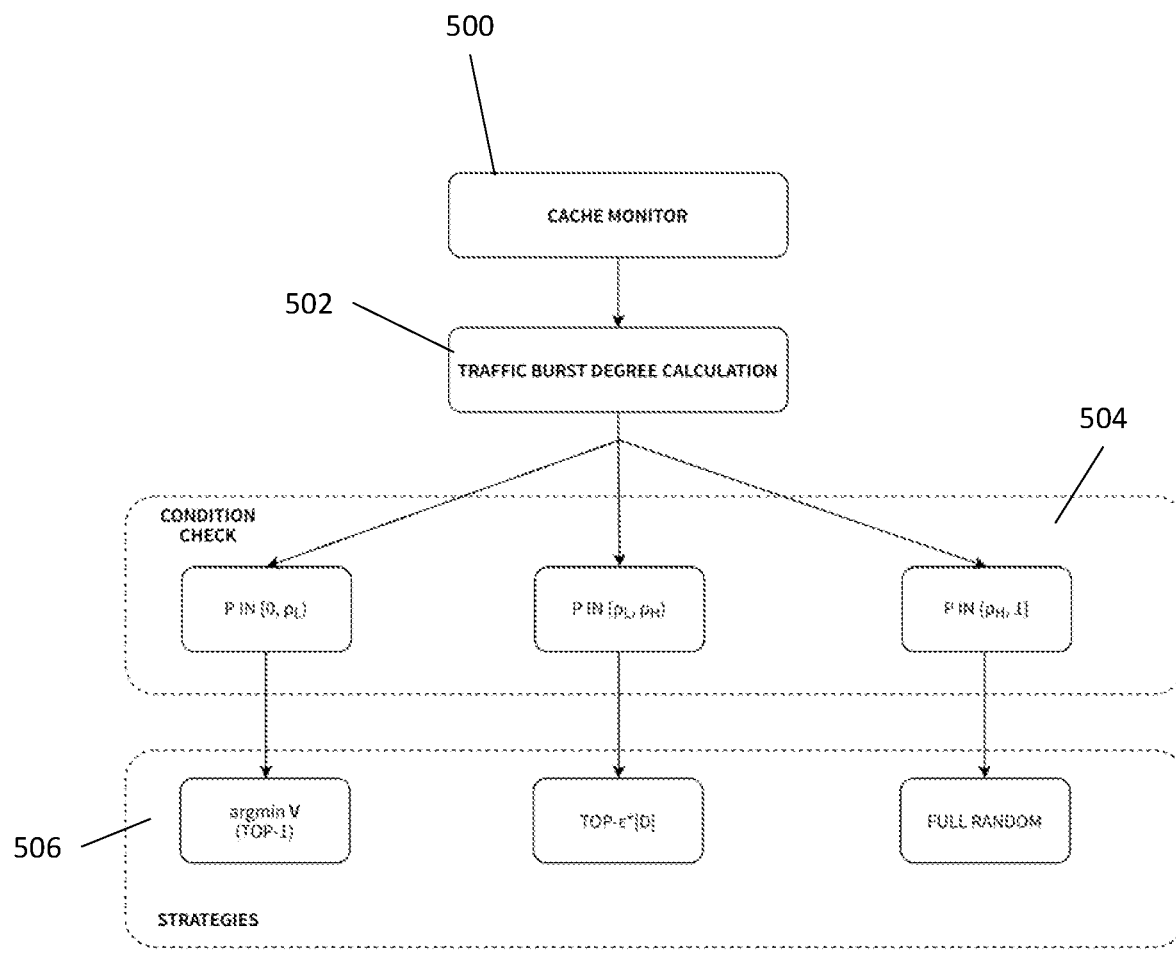
FIG. 5 shows a flowchart for determining and responding to traffic levels according to an embodiment.

FIG. 5 shows strategy selection for responding to operation traffic according to an embodiment. Cache monitor 500 provides information for traffic calculation module 502. The output from traffic calculation module 502 is compared to various thresholds at condition check module 504. Based on the comparisons made by condition check module 504, the assignment module 506 assigns the traffic to computing resources according to a selected strategy.

Cache monitor 500 is configured to monitor the traffic status for cache resources of a cache layer. Cache monitor 500 can be the cache layer monitor 114 of dispatch layer 104 in a distributed computing system 100 as described above and shown in FIG. 1. Cache monitor 500 can further control a strategy used for the assignment of operations to resources, such as I/O flows to cache resources based on the traffic conditions.

Traffic calculation module 502 is configured to determine a traffic level for the resources of the cache layer. The module can include any suitable hardware, software, and combinations thereof to determine a traffic level of the resources of the cache layer. In an embodiment, the traffic level can be defined based on a ratio of the workload in a write-intensive queue to the workload in a read-intensive queue, such as the read- and write-intensive queues 304, 306 described above and shown in FIG. 3. This ratio can increase when more write-intensive I/O flows are joining the queue, indicative of burst traffic. The use of such a ratio can reduce the computational overhead of making the traffic determination compared to other determinations of traffic, thus reducing the impact of determining traffic on overall system performance.

Condition check module 504 can be used to select the strategy used for the assignment of operations to resources, such as I/O flows to cache resources based on the traffic conditions. In an embodiment, condition check module 504 is configured to compare the calculated traffic from traffic calculation module to thresholds associated with particular assignment strategies responsive to the magnitude of a traffic burst. In an embodiment, there are two thresholds, a first threshold indicative of when assignment should be to a subset of the resources and a second threshold indicative of when the assignment should be to any or all of the resources. In an embodiment where the traffic is determined as a ratio of write-intensive operations to read-intensive operations in the respective queues as described above, the thresholds can be 70% write-intensive as the first threshold and 90% write-intensive as the second threshold.

Assignment module 506 is configured to assign the operations to resources according to one of the strategies, the strategy being selected by the condition check module 504. In the embodiment shown in FIG. 5, assignment module 506 can use one of three strategies to assign operations to resources.

When the condition check module 504 determines that the traffic is in a low condition, such as by being below the first threshold, the assignment module can select an individual resource to assign the operation to. The resource can be selected, for example, based on being the resource having the lowest determined performance volatility, for example according to the determination of performance volatility according to method 400 shown in FIG. 4 and described above.

When the condition check module 504 determines that the traffic is in a moderate condition, such as by being between the first threshold and the second threshold, a subset of resources of the layer can be selected as eligible for assignment, and the operations assigned randomly to resources in the subset. The size of the subset can be any suitable size for the architecture of the system, the type of computing devices in the layer, the extent of the traffic spike within the range between the first and second thresholds, or any other suitable factor or combinations thereof. The size of the subset can be predetermined, or determined dynamically. The performance volatility can be determined for the resources, and the resources having the lowest performance volatilities can be selected up to the size selected for the subset. The operations can then be assigned randomly to resources included in this subset. Random assignment keeps individual resources from being overloaded due to being a target destination during an identified period of increased traffic, while constraining random assignment continues to utilize knowledge of resource status to efficiently and fairly assign the operations to resources. The random assignment to a constrained set of resources can be according to the following function:

$$\text{list} \leftarrow \text{ascendsort}_{(d \in D)} \colon \mathbb{V}_{[d,\tau]} = \beta \cdot S_{[d,\tau]} + (1-\beta) \cdot \mathbb{V}_{[d,\tau-1]}$$

When the condition check module 504 determines that the traffic is in a high condition, such as by being above the second threshold, a fully random strategy can be used to assign the operations to any of the resources of the layer. The fully random strategy uses all of the available resources to respond to the highest traffic conditions.

The assignment strategy based on traffic condition can be expressed as a piecewise function, for example according to the following function:

$$K = \begin{cases} 1, & B_\tau \in [0, \rho_L] \\ \epsilon \cdot |D|, & B_\tau \in [\rho_L, \rho_H] \\ |D|, & B_\tau \in [\rho_H, 1] \end{cases}$$

Figure 6:
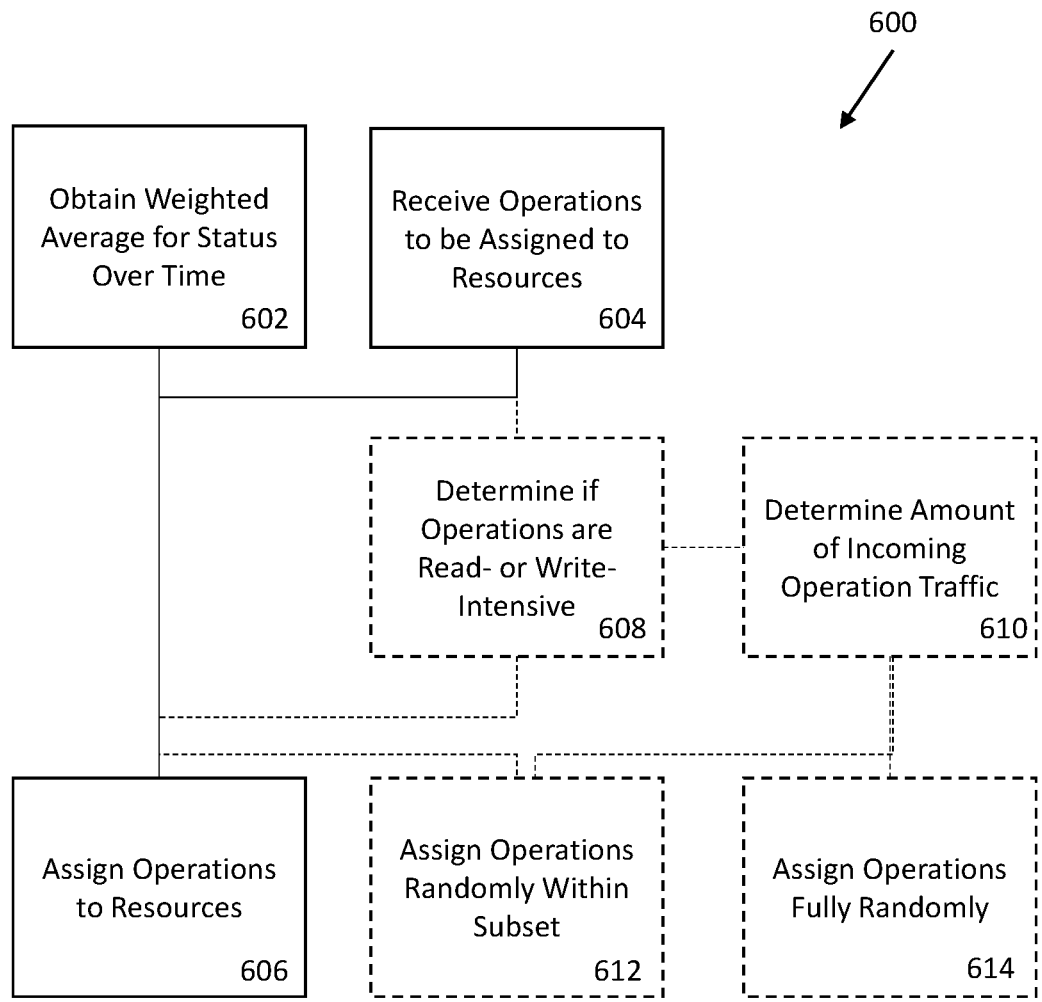
FIG. 6 shows a flowchart a method for assigning operations to computing resources according to an embodiment.

FIG. 6 shows a flowchart of a method for assigning operations to computing resources according to an embodiment. Method 600 includes obtaining weighted averages for status over time for decoupled computing resources at 602, receiving operations to be assigned to the decoupled computing resources at 604, and assigning the operations to the decoupled computing resources at 606. Optionally, method 600 further includes determining if the operations are read-intensive or write-intensive at 608. Optionally, method 600 includes determining an amount of incoming operation traffic 610, and optionally randomly assigning operations to a subset of the decoupled computing resources at 612 or optionally randomly assignment operations to the set of decoupled computing resources at 614.

Weighted averages for status over time for decoupled computing resources are obtained at 602. The decoupled computing resources can be the resources of a given layer of a distributed computing system, such as the cache layer 106 of distributed computing system 100 as described above and shown in FIG. 1. The decoupled computing resources can be same-type computing resources such as all of said same-type computing resources being, for example, one of CPUs, GPUs, memory devices, or the like. Weighted averages can be determined for some or all of the decoupled computing resources in a layer to which operations are to be assigned. The weighted averages can be determined, for example, according to the determination of weighted average for response times 406 as shown in FIG. 4 and discussed above. The averages for the status of each of the decoupled computing resources are weighted based on the time at which the status would be recorded, with higher weighting for more recent statuses of that computing resource. The weighted averages can be weighted according to any suitable weighting scheme, such as linear weighting, exponential weighting, or any other suitable weighting. In an embodiment, the weighted averages are exponentially weighted averages. The status of the decoupled computing resources for which the weighted average over time is obtained can be any suitable metric for evaluating the status of the particular computing resource, such as, for example, utilization levels, volatility in performance, latency, capacity, power consumption, or the like.

Operations to be assigned to the decoupled computing resources are obtained at 604. The operations can be any suitable operations for the decoupled computing resources. In an embodiment, the operations are I/O flows. The operations can be obtained from any suitable source, such as from client devices. In an embodiment, the operations can be obtained from client devices by way of APIs, libraries, or the like.

Operations are assigned to the decoupled computing resources at 606. The operations can be assigned by a dispatch layer, such as dispatch layer 106 or a layer comprised of dispatchers 300 as described above and shown in FIGS. 1 and 3. The operations can be assigned at 606 based on the weighted averages over time for the status of the decoupled computing resources, as obtained at 602. The assignment of the operations can be based on, for example, performance volatility of the resources, such as the performance volatility determined according to method 400 shown in FIG. 4 and described above.

Optionally, whether each operation is read-intensive or write-intensive can be determined at 608. This optional step can be performed when the operation is an I/O flow. The determination can be made by determining a relative read and write intensity, such as a read or write percentage of the I/O flow and comparing the relative read and write intensity to a suitable threshold. Based on the threshold, the I/O flow can be assigned to a read-intensive or a write-intensive queue, such as read-intensive and write-intensive queues 304, 306 as described above and shown in FIG. 3. The assignment of operations at 604 can be performed in part by drawing from the read-intensive and write-intensive queues according to a pick ratio, such as a 1: m pick ratio discussed above for assigning one write-intensive operation for each of a plurality of read-intensive operations.

Optionally, an amount of incoming operation traffic can be determined at 610. The determination can be based on any suitable metric for the operation traffic to be assigned to computing devices in the layer. For example, the amount of incoming operation traffic can be determined based on a ratio of write-intensive flows in the write-intensive queue to read-intensive flows in a read-intensive queue. An example function for determining the amount of incoming operation traffic at 610 can be the following:

$$B_{[\tau]} = \frac{^W[WIQ, \tau]}{^W[WIQ, \tau] + ^W[RIQ, \tau]}$$

Where $B_{[\tau]}$ (a burst degree of the I/O flows during epoch $\tau$) is defined based on the ratio of write-intensive queue workload amount during the current epoch versus the total workload amount of the write-intensive and read-intensive queues. $W_{[WIQ, \tau]}$ and $W_{[RIQ, \tau]}$ as used in the above function respectively represent the workload amount of the write- and read- intensive queses during epoch $\tau$. A higher burst degree indicates that there are more write-intensive I/O flows joining the queue compared to in the previous epoch.

Optionally, the operations can be randomly assigned to a subset of the decoupled computing resources at 612. Assignment to a subset of the decoupled computing resources at 612 can be based on the amount of incoming operation traffic being between a first threshold value and a second threshold value. The subset can be determined based on a subset size, and the status of the resources, with operations each being randomly assigned to one of the resources within the subset size. Determination of the size of the subset and selection of the resources for the subset can be according to the assignment strategy for a moderate traffic condition as described above and shown in FIG. 5.

Optionally, operations can be assigned randomly to the set of decoupled computing resources at 614. The random assignment at 614 is random assignment to any of the resources of the layer. The random assignment at 614 can be performed when a high amount of incoming operation traffic is determined at 610. The random assignment at 614 can be according to the assignment strategy for a high traffic condition as described above and shown in FIG. 5.

In an embodiment, a background monitoring system can be provided to evaluate the performance of the distributed computing system in response to workload demands. A background monitor can assess workload and evaluate the consistency and/or magnitude of spikes in such workload. The distributed computing system can be scaled according to the determination made by assessing the utilization status of multiple queues.

Figure 7:
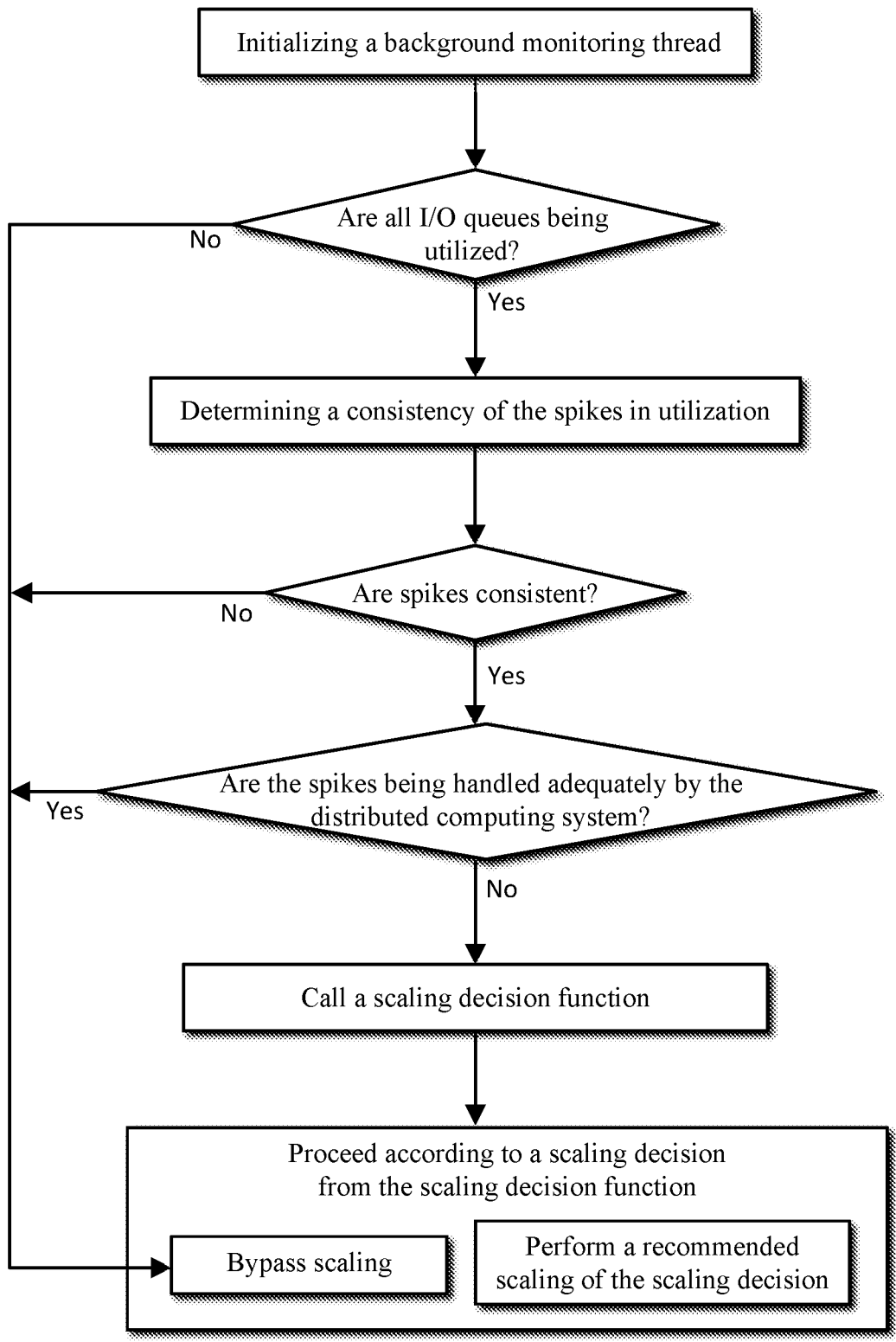
FIG. 7 shows a flowchart of a method for scaling operations according to an embodiment.

FIG. 7 shows a flowchart of a method for scaling operations according to an embodiment. As shown in FIG. 7, the background monitoring thread is initialized, and checks if all I/O queues are being fully utilized. If not all I/O queues are being utilized, the method can bypass further steps. When all I/O queues are being utilized, a consistency of the spike in utilization is determined. In an embodiment, the consistency of the spike can be determined according the method shown in FIG. 8. If the spikes are not consistent, the method can bypass other steps; when the spikes are consistent, whether the spikes are being handled adequately by the distributed computing system can be determined. If the system is managing the spikes effectively, the method can bypass further steps; if the spikes are causing the system to struggle, a scaling decision function can be called. In an embodiment, the scaling decision function can be according to the method shown in FIG. 9. The method can then proceed according to the scaling decision from the scaling decision function, by performing the recommended scaling or bypassing the scaling when it is determined not to perform scaling by the scaling decision function. In an embodiment, the scaling decision is provided as a recommendation to one or more system administrators. In an embodiment, the scaling decision can be implemented automatically.

The background monitoring thread can operate autonomously, running in the background while the main system continues its regular processes. The background monitoring can thereby mitigate instances of overload and promote seamless performance during fluctuating workloads while scaling resources efficiently.

Figure 8:
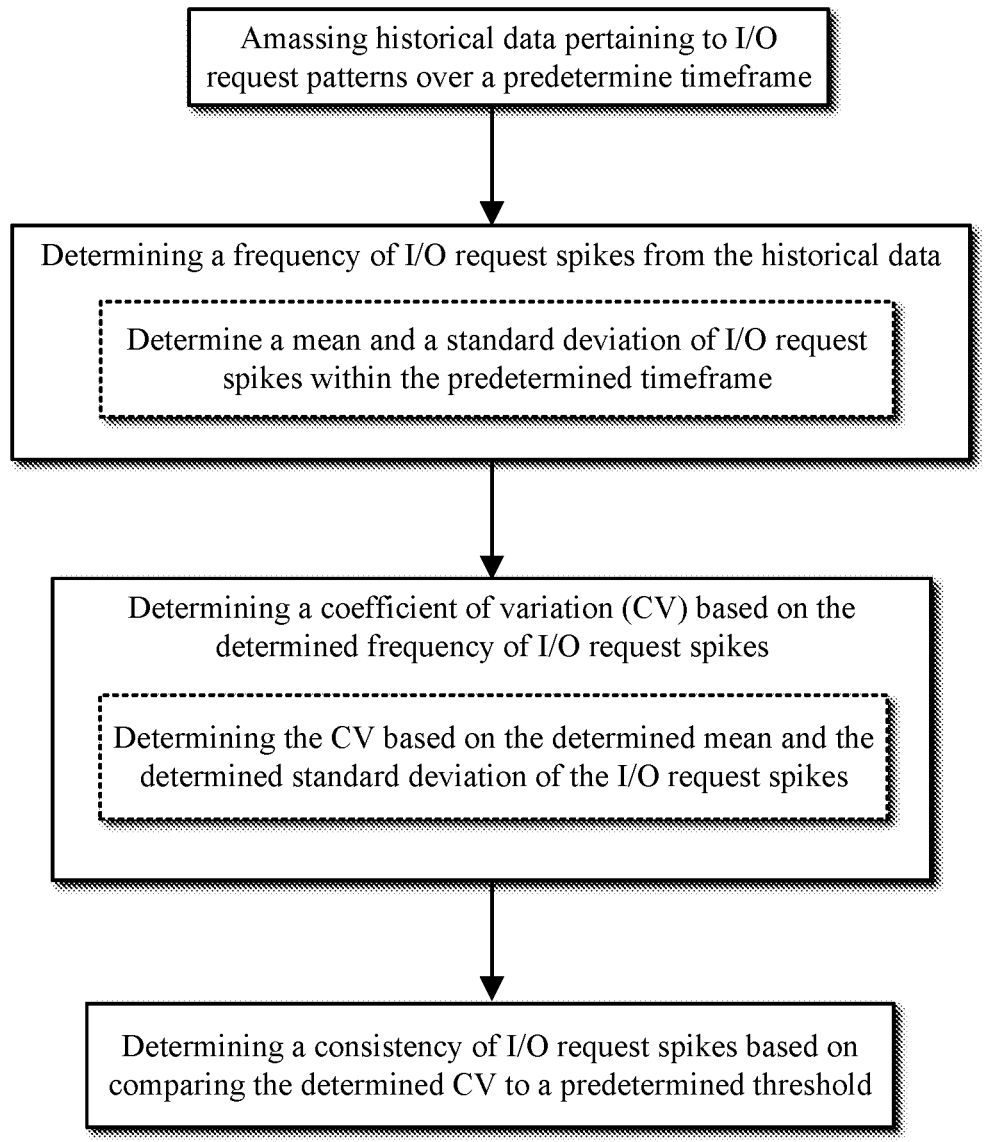
FIG. 8 shows a flowchart of a method for determining variability in spikes according to an embodiment.

FIG. 8 shows a flowchart of a method for determining variability in spikes according to an embodiment. As discussed above, the determination of variability in spikes shown in FIG. 7 can be integrated into the method for scaling operations shown in FIG. 7. The variability in spikes can be determined according to, for example, a coefficient of variation (CV). The CV can be a proportion of standard deviation to the mean in a dataset. The CV can be articulated as a percentage. To determine the CV, historical data pertaining to I/O request patterns can be systematically amassed over a predetermined timeframe. From the historical data, the frequency of I/O request spikes can be quantified. The mean and standard deviation of I/O request counts within the predefined temporal interval can then be determined from the frequency data regarding I/O request spikes. The CV is in turn computed from the mean and standard deviation. In an embodiment, the calculation of the CV involves dividing the standard deviation by the mean and subsequently multiplying by 100 to express the result as a percentage. This numerical output effectively encapsulates the extent of variance between the spikes and the average. The CV can be compared to a predetermined threshold, which serves as a benchmark below which spikes are characterized as uniform. An exemplar threshold could involve considering spikes as uniform when the CV is less than 20%.

Scaling decisions can be made based on evaluations of the total cost of ownership as well as the performance benefits offered by scaling and the manner thereof. The scaling decisions can include whether to scale, whether scaling should be conducted by scaling up or scaling out, and the like. The scaling decision can be presented as a choice for the discretion of the system administrator to make the final scaling decision. Scaling decisions can be based on whether a service cost rate is equivalent or lower than that of the current configuration. The service cost rate can be defined as a ratio of total cost of ownership to a maximal load capacity. In an embodiment, the difference in service cost rate must meet or exceed a predefined threshold to trigger a decision to scale up or scale out.

Figure 9:
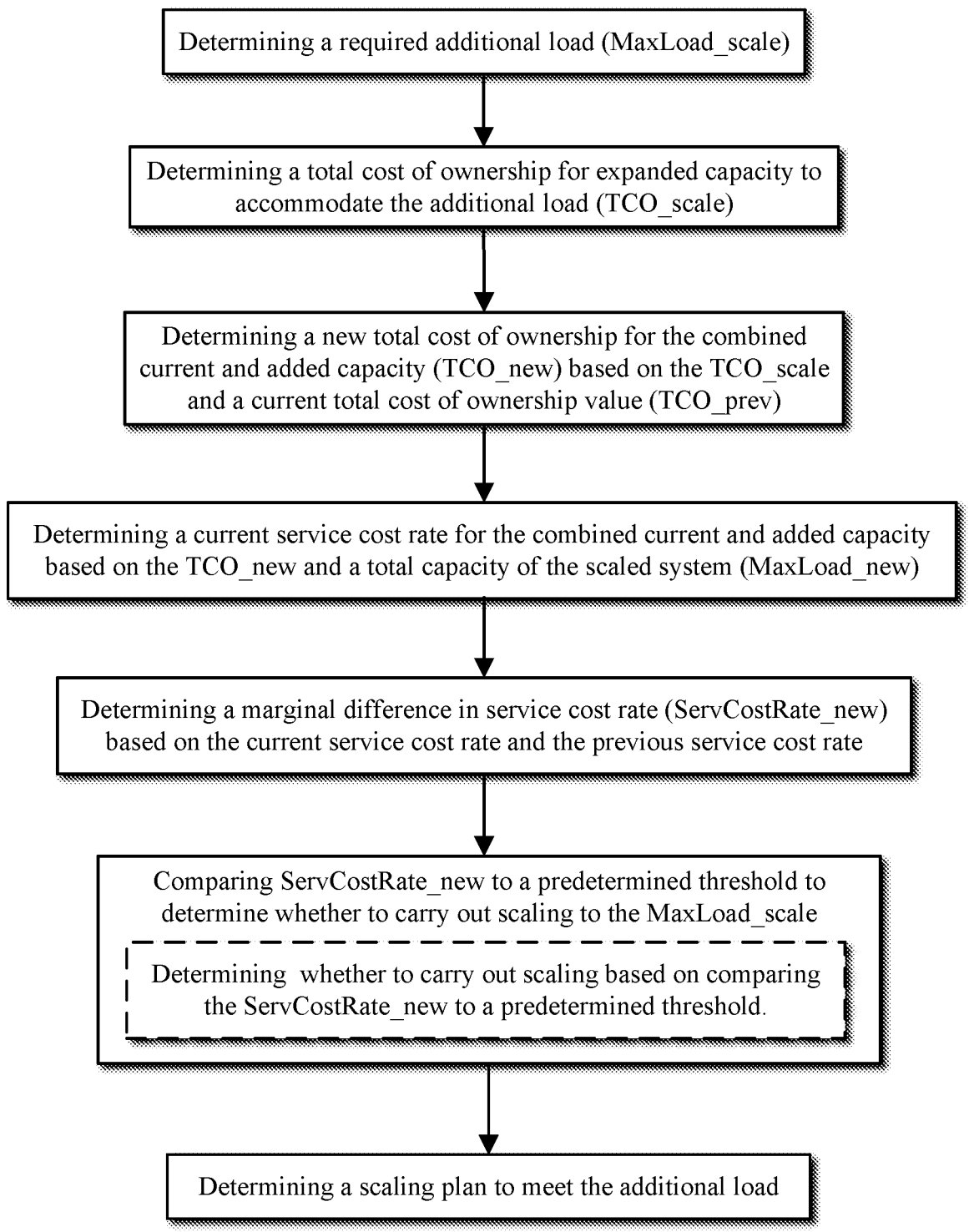
FIG. 9 shows a flowchart of a method for determining the scaling of operations according to an embodiment.

FIG. 9 shows a flowchart of a method for determining the scaling of operations according to an embodiment. The method of FIG. 9 begins with determining additional load that is required ("MaxLoad_scale"). The additional load can be determined by determining the extent to which the load exceeds existing capacity. A total cost of ownership for expanded capacity to accommodate the additional load then is determined ("TCO_scale"). The TCO_scale value can be added to a current total cost of ownership value ("TCO_prev") to obtain a new total cost of ownership for the combined current and added capacity ("TCO_new"). The MaxLoad_scale is added to the current load to obtain the total capacity of the scaled system ("MaxLoad_new"). A service cost rate for the combined current and added capacity can then be determined by dividing TCO_new by Max-Load_new. The current and previous service cost rates can be used to determine a marginal difference in service cost rate ("ServCostRate_new"), which can then be compared to the predetermined threshold. Based on this comparison, the determination can be made whether or not to carry out the scaling so as to meet the additional load. When it is determined to carry out scaling to meet the additional load, a function can be called to determine a scaling plan for the scaling to be performed.

Figure 10:
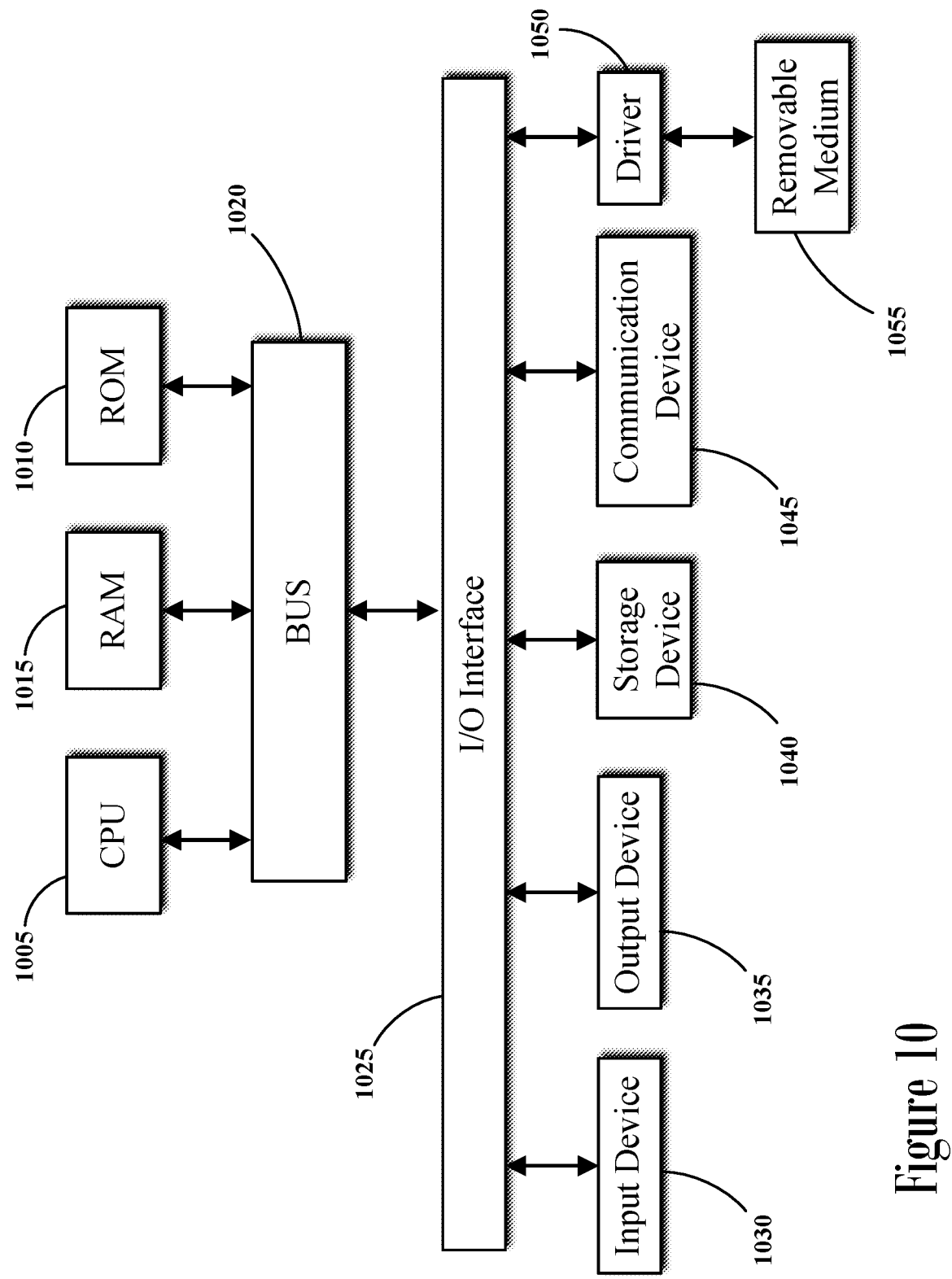
FIG. 10 shows a schematic structural diagram of an example computer system applicable to implementing an electronic device, arranged in accordance with at least some embodiments described herein.

FIG. 10 shows a schematic structural diagram of an example computer system applicable to implementing an electronic device, arranged in accordance with at least some embodiments described herein. It is to be understood that the computer system shown in FIG. 7 is provided for illustration only instead of limiting the functions and applications of the embodiments described herein.

As depicted, the computer system 1000 may include a central processing unit (CPU) 1005. The CPU 1005 may perform various operations and processing based on programs stored in a read-only memory (ROM) 1010 or programs loaded from a storage device 1040 to a random-access memory (RAM) 1015. The RAM 1014 may also store various data and programs required for operations of the system 1000. The CPU 1005, the ROM 1010, and the RAM 1020 may be connected to each other via a bus 1020. An input/output (I/O) interface 1025 may also be connected to the bus 1020.

The components connected to the I/O interface 1025 may further include an input device 1030 including a keyboard, a mouse, a digital pen, a drawing pad, or the like; an output device 1035 including a display such as a liquid crystal display (LCD), a speaker, or the like; a storage device 1040 including a hard disk or the like; and a communication device 1045 including a network interface card such as a LAN card, a modem, or the like. The communication device 1045 may perform communication processing via a network such as the Internet, a WAN, a LAN, a LIN, a cloud, etc. In an embodiment, a driver 1050 may also be connected to the I/O interface 1025. A removable medium 1055 such as a magnetic disk, an optical disk, a magneto-optical disk, a semiconductor memory, or the like may be mounted on the driver 1050 as desired, such that a computer program read from the removable medium 1055 may be installed in the storage device 1040.

Aspects:

It is understood that any of aspects 1-10 can be combined with any of aspects 11-17.

Aspect 1. A distributed computing system, comprising:
a first plurality of decoupled computing resources of a first type, the first plurality of decoupled resources being a first layer of the distributed computing resources;
a second plurality of decoupled computing resources of a second type, the second plurality of decoupled resources being a second layer of the distributed computing system, the second layer configured to receive operations provided by the first layer; and
a dispatch layer configured to assign at least some of the operations provided by the first layer to at least some of the computing resources of the second plurality of decoupled computing resources of the second layer based on a weighted moving average of the statuses over time of at least some of the second plurality of decoupled computing resources.

Aspect 2. The distributed computing system according to aspect 1,
wherein the first layer is a client layer,
wherein the second layer is a cache layer and the second plurality of decoupled computing resources are respective storage memories, and
wherein the operations are input/output (I/O) flows.

Aspect 3. The distributed computing system according to aspect 2, wherein the respective storage memories include dynamic random access memory (DRAM).

Aspect 4. The distributed computing system according to aspect 2, wherein the respective storage memories are solid state drives (SSDs).

Aspect 5. The distributed computing system of according to any of aspects 2-4, wherein the dispatch layer is configured to divide the I/O flows into a read-intensive queue and a write-intensive queue based on a write percentage of each of the I/O flows.

Aspect 6. The distributed computing system according to aspect 5,
wherein the dispatch layer is configured to assign I/O flows of the read-intensive queue and I/O flows of the write-intensive queue according to a pick ratio, and
wherein the pick ratio is a ratio of a plurality of I/O flows of the read-intensive queue to be assigned for each one of the I/O flows of the write-intensive queue to be assigned.

Aspect 7. The distributed computing system according to any of aspects 1-6, wherein the weighted average is an exponentially weighted moving average.

Aspect 8. The distributed computing system according to any of aspects 1-7, wherein the dispatch layer is configured to determine an amount of incoming operation traffic.

Aspect 9. The distributed computing system according to aspect 8, wherein the dispatch layer is configured to:
compare the determined amount of incoming operation traffic to a first threshold and a second threshold, and
when the amount of incoming operation traffic is above the first threshold and below the second threshold, to assign the operations provided by the first layer randomly among a subset of the computing resources of the second plurality the subset selected based on a weighted moving average of the statuses over time of the second plurality of decoupled computing resources.

Aspect 10. The distributed computing system according to aspect 9, wherein the one or more processors are configured to assign the operations provided by the first layer randomly to the entire second plurality of computing resources when the amount of incoming operation traffic is above the second threshold.

Aspect 11. A method for assigning operations to computing resources, comprising:
obtaining weighted averages for a status over time of a plurality of decoupled computing resources;
receiving one or more operations to be assigned to the plurality of decoupled computing resources; and
assigning the one or more operations to at least some of the plurality of decoupled computing resources based on the weighted averages for the status over time of a plurality of decoupled computing resources.

Aspect 12. The method according to aspect 11, wherein the weighted averages are exponential weighted averages.

Aspect 13. The method according to any of aspects 11-12, wherein the operations are input/output (I/O) flows, and
wherein the method further comprises dividing the I/O flows into a read-intensive queue and a write-intensive queue based on a write percentage of each of the I/O flows.

Aspect 14. The method according to aspect 13,
wherein the I/O flows of the read-intensive queue and I/O flows of the write-intensive queue are assigned according to a pick ratio, and
wherein the pick ratio is a ratio of a plurality of I/O flows of the read-intensive queue to be assigned for each one of the I/O flows of the write-intensive queue to be assigned.

Aspect 15. The method according to any of aspects 11-14, further comprising determining an amount of incoming operation traffic.

Aspect 16. The method according to aspect 15, further comprising:
comparing an amount of incoming operation traffic to a first threshold, and a second threshold, and
when the amount of incoming operation traffic is above the first threshold and below the second threshold, assigning the operations provided by the first layer randomly among a subset of the computing resources of the second plurality, the subset selected based on a weighted moving average of the statuses over time of the second plurality of decoupled computing resources.

Aspect 17. The method according to aspect 16, wherein when the amount of incoming operation traffic is above the second threshold, assigning the operations provided by the first layer randomly to the entire second plurality of computing resources.

Aspect 18. A data center, comprising:
a first plurality of decoupled computing resources of a first type;
a second plurality of decoupled computing resources of a second type; and
a dispatch layer configured to assign at least some operations provided by the first layer to at least some of the computing resources of the second plurality of decoupled computing resources of the second layer based on a weighted moving average of the statuses over time of at least some of the second plurality of decoupled computing resources.

Aspect 19. The data center according to aspect 18, wherein the decoupled computing resources of the second type are cache storage memories.

Aspect 20. The data center according to aspect 19, wherein said operations are I/O flows, and the dispatch layer is configured to divide the I/O flows into a read-intensive queue and a write-intensive queue based on a write percentage of each of the I/O flows.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A distributed computing system, comprising:
a first plurality of decoupled computing resources of a first type, the first plurality of decoupled resources being a first layer of the distributed computing resources;
a second plurality of decoupled computing resources of a second type, the second plurality of decoupled resources being a second layer of the distributed computing system, the second layer configured to receive operations provided by the first layer; and
a dispatch layer configured to assign at least some of the operations provided by the first layer to at least some of the computing resources of the second plurality of decoupled computing resources of the second layer based on a weighted moving average of the statuses over time of at least some of the second plurality of decoupled computing resources.

2. The distributed computing system of claim 1,
wherein the first layer is a client layer,
wherein the second layer is a cache layer and the second plurality of decoupled computing resources are respective storage memories, and
wherein the operations are input/output (I/O) flows.

3. The distributed computing system of claim 2, wherein the respective storage memories include dynamic random access memory (DRAM).

4. The distributed computing system of claim 2, wherein the respective storage memories are solid state drives (SSDs).

5. The distributed computing system of claim 2, wherein the dispatch layer is configured to divide the I/O flows into a read-intensive queue and a write-intensive queue based on a write percentage of each of the I/O flows.

6. The distributed computing system of claim 5,
wherein the dispatch layer is configured to assign I/O flows of the read-intensive queue and I/O flows of the write-intensive queue according to a pick ratio, and
wherein the pick ratio is a ratio of a plurality of I/O flows of the read-intensive queue to be assigned for each one of the I/O flows of the write-intensive queue to be assigned.

7. The distributed computing system of claim 1, wherein the weighted average is an exponentially weighted moving average.

8. The distributed computing system of claim 1, wherein the dispatch layer is configured to determine an amount of incoming operation traffic.

9. The distributed computing system of claim 8, wherein the dispatch layer is configured to:
compare the determined amount of incoming operation traffic to a first threshold and a second threshold, and
when the amount of incoming operation traffic is above the first threshold and below the second threshold, to assign the operations provided by the first layer randomly among a subset of the computing resources of the second plurality the subset selected based on a weighted moving average of the statuses over time of the second plurality of decoupled computing resources.

10. The distributed computing system of claim 9, wherein the one or more processors are configured to assign the operations provided by the first layer randomly to the entire second plurality of computing resources when the amount of incoming operation traffic is above the second threshold.

11. A method for assigning operations to computing resources, comprising:
obtaining weighted averages for a status over time of a plurality of decoupled computing resources;
receiving one or more operations to be assigned to the plurality of decoupled computing resources; and
assigning the one or more operations to at least some of the plurality of decoupled computing resources based on the weighted averages for the status over time of a plurality of decoupled computing resources.

12. The method of claim 11, wherein the weighted averages are exponential weighted averages.

13. The method of claim 11,
wherein the operations are input/output (I/O) flows, and
wherein the method further comprises dividing the I/O flows into a read-intensive queue and a write-intensive queue based on a write percentage of each of the I/O flows.

14. The method of claim 13,
wherein the I/O flows of the read-intensive queue and I/O flows of the write-intensive queue are assigned according to a pick ratio, and
wherein the pick ratio is a ratio of a plurality of I/O flows of the read-intensive queue to be assigned for each one of the I/O flows of the write-intensive queue to be assigned.

15. The method of claim 11, further comprising determining an amount of incoming operation traffic.

16. The method of claim 15, further comprising:
comparing an amount of incoming operation traffic to a first threshold, and a second threshold, and
when the amount of incoming operation traffic is above the first threshold and below the second threshold, assigning the operations provided by the first layer randomly among a subset of the computing resources of the second plurality, the subset selected based on a weighted moving average of the statuses over time of the second plurality of decoupled computing resources.

17. The method of claim 16, wherein when the amount of incoming operation traffic is above the second threshold, assigning the operations provided by the first layer randomly to the entire second plurality of computing resources.

18. A data center, comprising:
a first plurality of decoupled computing resources of a first type;
a second plurality of decoupled computing resources of a second type; and
a dispatch layer configured to assign at least some operations provided by the first layer to at least some of the computing resources of the second plurality of decoupled computing resources of the second layer based on a weighted moving average of the statuses over time of at least some of the second plurality of decoupled computing resources.

19. The data center of claim 18, wherein the decoupled computing resources of the second type are cache storage memories.

20. The data center of claim 19, wherein said operations are I/O flows, and the dispatch layer is configured to divide the I/O flows into a read-intensive queue and a write-intensive queue based on a write percentage of each of the I/O flows.

* * * * *